Nov. 26, 1968  W. A. SWIM ET AL  3,413,541
APPARATUS FOR DETECTING INSULATION FAULTS IN MAGNET
WIRE UTILIZING FIELD EFFECT TRANSISTOR
Filed Feb. 24, 1967
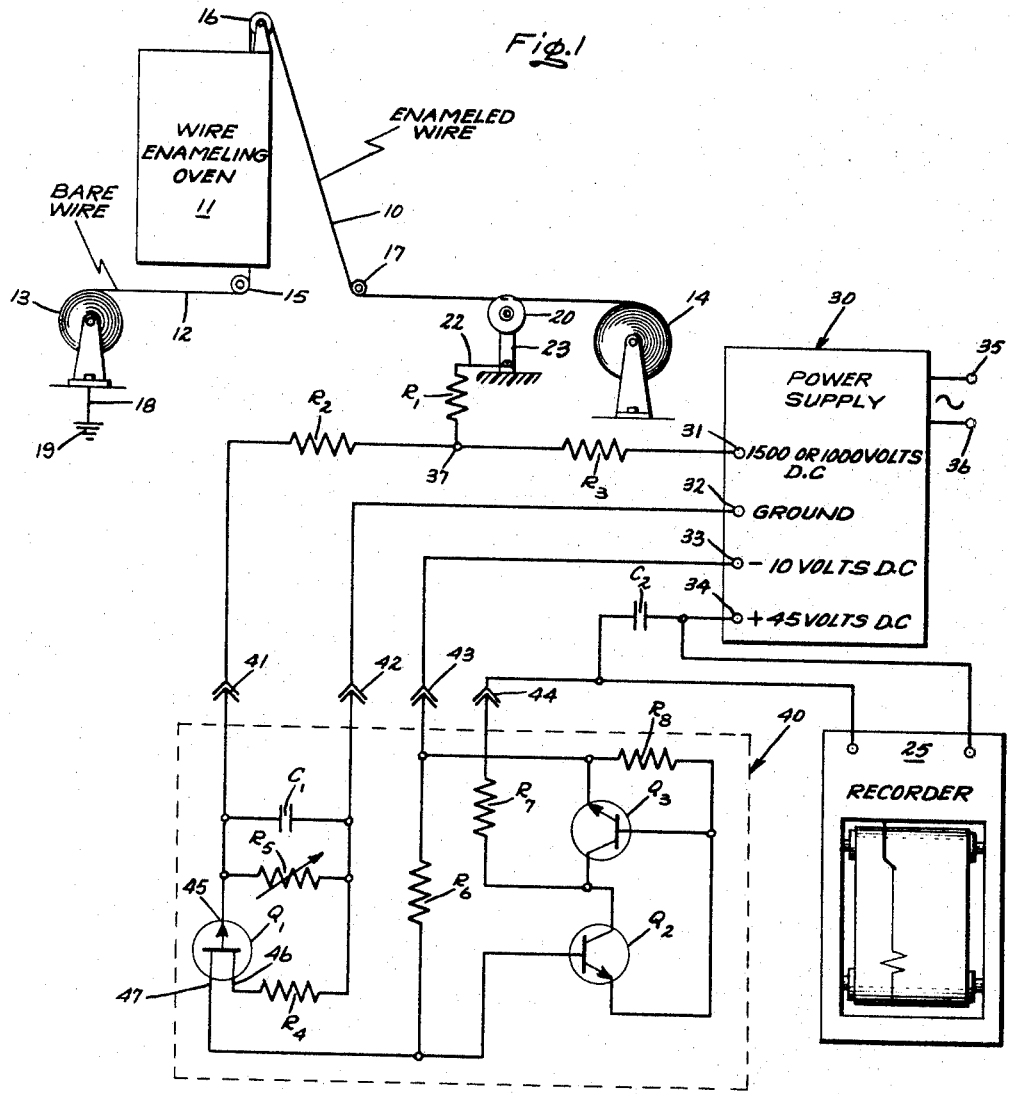
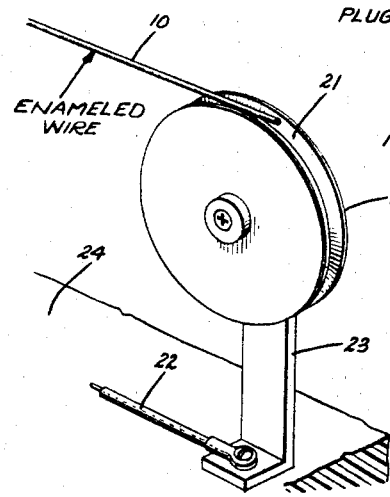
Inventors:
William A. Swim,
Harry L. Kellogg,
by Henry J. Marcinko
Attorney.

United States Patent Office 3,413,541
Patented Nov. 26, 1968

3,413,541
APPARATUS FOR DETECTING INSULATION
FAULTS IN MAGNET WIRE UTILIZING
FIELD EFFECT TRANSISTOR
William A. Swim and Harry L. Kellogg, Fort Wayne, Ind.,
assignors to General Electric Company, a corporation
of New York
Filed Feb. 24, 1967, Ser. No. 618,430
4 Claims. (Cl. 324—54)

ABSTRACT OF THE DISCLOSURE

Test apparatus for detecting faults in the insulation coating of moving insulated wire. A relatively high direct current potential is applied by a contact wheel to the surface of the insulation coating of the moving wire. The contact wheel is connected to tap connection of a voltage divider having a first impedance branch connected to a direct current potential source and a second impedance branch. The first impedance branch preferably limits the current supplied to the contact wheel to a magnitude of not more than 25 microamperes. A current sensing circuit is connected in the second impedance branch of the potential divider and utilizes a field effect transistor te detect changes in current, the field effect transistor being switched into a conducting state in response to a predetermined drop in the current flow in the second branch thereby to indicate the occurrence of a fault in the insulation coating of the insulated wire. The current sensing circuit may be connected to a recorder or other device for recording or counting the faults occurring in the wire insulation.

Background of the invention

This invention relates to apparatus for testing the insulation coating of insulated wire to detect faults such as discontinuities and the like. More particularly it relates to such apparatus that is adapted to detect faults in the insulation coating of insulated wire while the magnet wire is moving at relatively high speeds and without destroying the insulation.

Insulated wire such as magnet wire is produced in commercial quantities from bare copper or aluminum wire by applying the liquid resin enamel to the bare wire and curing the resin enamel coating by passing the wire through an enameling oven. To obtain the desired insulation build, a preselected number of passes are made through the enameling oven. Fine magnet wire leaves the enameling oven at speeds ranging from 80 to 200 feet per second, and as many as 20 strands of wire may be run through the enameling oven.

Although it is extremely desirable that insulation coating of magnet wire be entirely free of any faults, this has not been readily achieved in the commercial production of magnet wire. At best manufacturers of magnet wire can assure their customers that any particular magnet wire produced by them will have no more than a specified number of faults in the insulation per hundred feet of magnet wire. In order to make such a representation, the magnet wire manufacturer must continuously test the magnet wire to determine the number of discontinuities in the insulation coating on the magnet wire. The testing is normally carried out as the enamel coated wire leaves the enameling oven but before the enamel coated wire is wound on spools.

In a well known method for detecting faults in the electrical insulation of magnet wire, the enamel coated wire is passed through a conductive medium such as mercury. The conductive medium is connected to a source of voltage, and the metallic conductor of the enameled wire is normally grounded as the bare wire enters the enameling applicator portion of the enameling oven. When a discontinuity occurs in the insulation of the magnet wire, current will flow through the conductor to ground. A current detecting circuit will transmit a corresponding signal to a multi-channeled recorded to register any occurrence of a fault of the enameling oven.

According to another method of the prior art, the magnet wire leaving the enameling oven is engaged with a contact wheel. The contact wheel is connected to a source of alternating voltage. When there is a break in the insulation engaging the contact wheel, a magnetic amplifier coupled in the circuit provides a change in output voltage that is responsive to changes in current flow in the fault circuit. A wire testing apparatus of this type is described in United States Patent 2,809,349 granted to M. L. Miller on Oct. 8, 1957. While this testing apparatus of the prior art has been satisfactory in many respects, inherent disadvantages are that the current levels used are in excess of 100 microamperes, and the signal-to-noise ratio has not been entirely satisfactory in practice. Also, magnetic amplifiers are relatively expensive devices, and for testing 20 strands of magnet wire 20 magnetic amplifiers would normally be required.

There is a need therefore for an improved testing apparatus for continuously detecting faults in the insulation coating on magnet wire that would only draw current significantly less than 100 microamperes when a fault occurs. Preferably, this maximum current should be in the order of 25 microamperes or less to insure that fine magnet wires cannot possibly be destroyed by the test apparatus and to provide a system that is ignition proof. It is further desirable that the test apparatus have a satisfactory signal-to-noise ratio and be relatively easy to manufacture and maintain.

Accordingly, it is a general object of this invention to provide an improved testing apparatus for detecting faults in the insulation coating of insulated wire.

Another object of this invention is to provide an improved apparatus for detecting faults in the insulation coating of magnet wire that will result only in significantly small current flow through the conductor of the magnet wire when a fault occurs in the insulation coating.

It is a still further object of this invention to provide an improved apparatus for continuously testing the insulated magnet wire that can be economically manufactured and readily maintained.

Summary of the invention

In accordance with one form of our invention, we have provided an improved apparatus for detecting faults in the insulation coating of moving insulated wire. This improved apparatus includes a contact means, such as a wheel, for engaging the surface of the insulation coating of the moving insulated wire and a direct current supply means for supplying to the contact means direct current at a preselected potential level. Preferably, the direct current supply means includes a potential divider having a first impedance branch for connection to a source of direct current potential and a second impedance branch joined in circuit with the first impedance branch by a tap connection. The tap connection is joined in electrical circuit with the contact means, and the first impedance branch limits the direct current supplied to the contact means when a fault occurs to a preselected maximum value. In the exemplification of the invention, this maximum value preferably is not greater than 25 microamperes.

A current sensing circuit is connected in the second impedance branch of the potential divider for supplying a signal responsive to changes in the current at the contact means thereby to provide an indication of the occurrence of a fault in the wire insulation. In a more specific aspect of the invention, a field effect transistor is utilized in the current sensing circuit to detect current changes resulting from a current flow to ground through a fault in the insulation coating of the insulated wire engaging the contact means. Preferably, the contact circuit branch containing the contact means and the insulated wire and the second impedance branch of the potential divider provide parallel paths for the flow of current from the direct current source when a fault occurs in the insulated wire. An increase in the current in the contact circuit branch will cause a corresponding decrease in the current flow in the second impedance branch of the current sensing circuit. The field effect transistor is switched to a conducting state by the decreased current in the second impedance branch to provide the signal responsive to changes in the current flow in the parallel contact branch.

An important advantage of the test apparatus is that the current flow through the wire tested is limited to relatively low levels so that the test apparatus is essentially ignition proof. With the improved circuit arrangement of the test apparatus, it is possible to limit the current flow when a fault occurs to a magnitude not greater than 25 microamperes. To facilitate maintenance and replacement of parts, plug-in circuit boards can be readily utilized in the improved test apparatus.

The subject matter which we regard as our invention is particularly pointed out and distinctly claimed in the concluding portion of this specification. Our invention itself, however, both as to its organization and method of operation together with further objects and advantages thereof may be best understood by reference to the following description taken in connection with the accompanying drawings.

Brief description of the drawing

In the drawings:
FIGURE 1 is a schematic circuit diagram of one exemplification of our improved test apparatus, the power supply being shown in block diagram form; and
FIGURE 2 is a view in perspective of the contact wheel shown in engagement with the enameled or insulated wire.

Brief description of the preferred embodiment

Having more specific reference now to FIGURE 1 of the drawings, we have illustrated therein one form of our improved apparatus for detecting faults in the insulation coating of magnet wire as applied to wire 10 as it leaves a wire enameling oven 11. Although in the schematic illustration of FIGURE 1, only one strand of wire 10 is shown coming out of the wire enameling oven 11, it will be appreciated that in actual practice as many as 20 strands may be run through the wire enameling oven. It will be seen that the bare wire 12 is dereeled from a spool 13 and is passed through the wire enameling oven 11 at the bottom where suitable resin enamel is applied to the bare wire, and the resin coating is cured as it passes vertically through the oven 11. The enameled or insulated wire 10 is then wound on a reel 14. Pulleys 15, 16 and 17 guide the movement of the wire.

As the bare wire 12 is dereeled and guided into the inlet of the wire enameling oven 11, it is effectively grounded, and this connection to ground is shown schematically by a connection 18 to ground 19. In the pratcice of the present invention, it is necessary that the metallic conductor of the insulated wire 10 be effectively grounded so that current will flow from a contact wheel 20 to ground 19 when a fault occurs in the enamel or insulation coating on the insulated wrie or when there is no insulation coating on the wire as it passes over the contact wheel 20. Although this ground connection is shown at the spool 13, it will be appreciated that bare wire may also be effectively grounded at other locations as it travels to the wire enameling oven 11.

The moving insulated wire 10 engages a groove 21 formed in the contact wheel 20. When a fault occurs in the insulation coating of the portion of insulated wire 10 traveling over the contact wheel 20, a current will flow from lead 22 through the wheel support bracket 23, the contact wheel 20, the metallic conductor of the wire and through the connection 18 to ground 19. The contact wheel 20 is insulated from ground by virtue of its being mounted on a support 24 made of insulating material.

In the illustrated embodiment of the invention, a power supply 30 is capable of providing either a 1500 or 1000 volt direct current source at connector 31, a ground connection at connector 32, a $-10$ volt direct current source at connector 33, and a $+45$ volt direct current source at connector 34. As shown in FIGURE 1, the power supply 30 includes a pair of alternating current input terminals 35, 36 adapted for connection to an external source of single phase alternating current.

When there is no fault in the insulation coating on the wire 10 engaging the contact wheel 20, the resistors $R_2$ and $R_3$ serves as a potential divider. For this no-fault condition, the resistive values of $R_2$ and $R_3$ in the exemplification of the invention were equal so that the potential at the tap connection 37 was one half of the potential at connector 31. The resistive value of the resistor $R_3$ is selected so that the maximum current is limited to a preselected magnitude, preferably 25 microamperes or less when the contact wheel engages a fault in the insulation of the magnet wire to complete the circuit to ground in the tap branch circuit which includes resistor $R_1$, lead 22 and contact wheel 20. It will be appreciated that the resistor $R_3$ forms a first impedance branch of the potential divider while the resistor $R_2$ forms the second impedance branch. A resistor $R_1$ may be connected in series circuit with the contact wheel 20 to dissipate the energy stored in the distributed capacitance of the lead brought out from the tap connection 37 of the potential divider.

A current sensing circuit is shown enclosed in the dashed rectangle identified by reference numeral 40 and includes a current detecting branch consisting of a field effect transistor $Q_1$, resistor $R_4$, $R_5$, capacitor $C_1$, and an amplifying branch. The amplifying branch is comprised of the transistors $Q_2$ and $Q_3$ and the resistors $R_6$, $R_7$, and $R_8$. As will be seen from the plug-in connections 41, 42, 43, and 44, the current sensing circuit 40 can be adapted for installation as a plug-in circuit board.

In accordance with an important aspect of the present invention, a current sensing circuit 40, including the field effect transistor $Q_1$, is used to amplify the current in the impedance branch containing resistor $R_2$ when a fault occurs in the magnet wire 10 engaging the contact wheel 20. The field effect transistor $Q_1$, as used in the practice of our invention, is comprised of a bar of semiconductor material which provides a non-rectifying current path, referred to generally as a channel. The effective cross-section of this channel or thereby the conductance is controlled by an electrostatic field. If a reverse bias voltage is applied to the gate terminal 45 of the field effect transistor $Q_1$, the resulting field depletes the channel and thereby reduces the conductivity between the source terminal 46 and the drain terminal 47. Although a junction P-channel field effect transistor was used in the exemplification of the invention, it will be appreciated that an N-channel field effect transistor and other semiconductor devices capable of low current sensing, such as a metal-oxide semiconductor field effect transistor, can also be used in the current detecting branch of the current sensing circuit.

In the exemplification of our invention the resistor $R_5$ was variable and was adjusted to obtain the desired cut-in point of the field effect transistor $Q_1$. The purpose of resistor $R_4$ is to stabilize against effects of temperature fluctuation on the channel current. The capacitor $C_1$ protects the field effect transistor $Q_1$ against possible damage from transient voltages.

As will hereinafter be more fully explained in connection with the description of the operation of the test apparatus, the current detecting branch will activate the amplifier branch and a relay (not shown) of the recorder 25, when current flows to ground through a fault in the insulation coating of the insulated wire contacting the wheel 20. During the no-fault condition the current at the drain terminal 47 is essentially zero. It will be noted that transistors $Q_2$ and $Q_3$ of the amplifying branch form a Darlington connection. Resistor $R_6$ is used to provide an optimum operating range for the field effect transistor $Q_1$, with respect to the amplifying branch. Resistor $R_7$ limits the maximum current to transistor $Q_3$ to its rated value while resistor $R_8$ connected across the emitter-base junction of transistor $Q_3$ is provided to insure turn-off of transistor $Q_3$.

It will be understood that the amplifying branch is energized when the drain terminal 47 of the field effect transistor $Q_1$ causes a positive going input signal to be applied at the base of transistor $Q_2$. When the amplifying branch is energized, the capacitor $C_2$ is charged very rapidly to approximately 55 volts, which is the algebraic sum of the +45 volt and −10 volt direct current supplies.

During operation the insulated wire 10 coming from the wire enameling oven 11 is engaged by the contact wheel 20. With no faults in the insulation coating of the insulated wire 10 passing over the contact wheel, the gate to source voltage of the field effect transistor $Q_1$ is sufficient to hold it in a non-conducting state, and the current at the drain terminal 47 is essentially zero. In the test apparatus used to exemplify the invention, the normal current passing through resistor $R_2$ during this no-fault condition is approximately five microamperes. Adjustment of resistor $R_5$ is made so that when a fault in the insulation coating causes this normal current to drop to approximately four microamperes, current will start to flow from the drain terminal 47 of the field effect transistor $Q_1$ and cause a positive going input signal to be applied at the base of transistor $Q_2$ to switch it and transistor $Q_3$ into a conducting state. The amplifying branch will start to provide a charging voltage on the capacitor $C_2$ connected in parallel with the relay of the recorder 25. The full voltage from the power supply 30 will be applied very rapidly to the capacitor $C_2$ when the current through resistor $R_2$ falls off to approximately 3 microamperes. The recorder relay subsequently will pick up due to the stored energy in the capacitor $C_2$, and the fault will be recorded even though it may be of very short duration.

In the illustrated embodiment of our invention, when the test apparatus was energized from a 1500 volt direct current source, the maximum continuous current through any fault was approximately 13.3 microamperes. It will be appreciated that the actual peak current may be somewhat higher due to the discharge of the distributed capacitance of the lead wire and the capacitance of the wheel to ground. An important advantage resulting of the improved test apparatus is that this energy can be insufficient to cause ignition of an explosive atmosphere.

By way of further exemplification of the invention, the test apparatus shown in FIGURE 1 was constructed and reduced to practice. The following circuit components are given by way of illustration of a specific exemplification of our invention:

Resistor $R_1$ _____ 10,000 ohms.
Resistor $R_2$ _____ 100 megohms.
Resistor $R_3$ _____ 100 megohms.
Resistor $R_4$ _____ 2200 ohms.
Resistor $R_5$ _____ 200,000 ohms to 1 megohm.
Resistor $R_6$ _____ 47,000 ohms.
Resistor $R_7$ _____ 27 ohms.
Resistor $R_8$ _____ 2200 ohms.
Capacitor $C_1$ _____ 33 picafarads.
Capacitor $C_2$ _____ 6 microfarads.
Field effect transistor $Q_1$ ___ 2N2608.
Transistor $Q_2$ _____ 2N2405.
Transistor $Q_3$ _____ 2N3054.
Recorder _____ Esterline Angus S–7060.

Although in the illustrative exemplification of our invention, a contact wheel 20 was used to engage the insulated wire for purpose of detecting faults in the insulation, it will be understood that other types of contact devices may be employed for this purpose and that more than one contact device may be used for a single strand of wire. Further, while a field effect transistor has been employed in our illustrative exemplification, it will be appreciated that other semiconductor devices capable of sensing small current signals may be employed in the practice of our invention.

From the foregoing description, it will be apparent that with our improved apparatus it is possible to readily test the insulation of magnet wire as it leaves a wire enameling oven at a relatively high speed. Although the wire provides a path for the current flow to ground when a break occurs in the wire, the magnitude of this current can advantageously be limited to a preselected maximum preferably no greater than 25 microamperes.

Although I have described our invention in connection with a specific exemplification thereof, it will be appreciated that many modifications may be made thereto without departing from the invention. It is therefore intended by the appended claims to cover all such modifications that fall within the true spirit and scope of the invention.

What we claim as new and desire to secure by Letters Patent of the United States is:

1. Apparatus for detecting faults in the insulation coating of moving insulated wire, said moving insulated wire having a grounded conductor, said apparatus comprising: contact means for engaging the surface of the insulation coating of the moving insulated wire, direct current supply means for supplying to said contact means direct current at a preselected potential level and for limiting the direct current at said contact means to a magnitude not greater than 25 microamperes when a fault occurs in the insulation coating, and current sensing means coupled with said direct current supply means for supplying a signal responsive to the change in the current at said contact means thereby indicating the occurrence of a fault in the insulation coating of said moving insulated wire, said current sensing means including a field effect transistor connected in circuit with said direct current potential supply means to monitor the direct current supply to said contact means, and said field effect transistor being switched into conduction in response to a predetermined change in the magnitude of the direct current supplied to said contact means.

2. The apparatus set forth in claim 1 wherein a recording means is coupled with said current sensing means to provide a record of faults occurring in the insulation coating of said moving insulated wire.

3. Apparatus for detecting faults in the insulation coating of moving insulated wire having a grounded conductor, said apparatus comprising: contact means for engaging the surface of the insulation coating of the moving insulated wire, a direct current potential divider including a first impedance branch for connection with a source of direct current potential and a second impedance branch joined in circuit with said first impedance branch by a tap connection, circuit means connecting said tap connection in circuit with said contact means to supply the direct current potential at said contact means, said first impedance branch limiting the current supplied to said contact means when a fault occurs in the insulation coating engaging said contact means to a magnitude no greater than 25 microamperes, and current sensing means connected in circuit with said second impedance branch for supplying a signal in response to a predetermined drop in the current in said second impedance branch, said signal thereby indicating the occurrence of a fault in the insulation coating of said moving insulated wire, said current sensing means including a field effect transistor connected in circuit with said second impedance branch and said field effect transistor being switched into a conducting state in response to said predetermined drop in the current of said second impedance branch.

4. The apparatus set forth in claim 3 wherein recording means is coupled with said current sensing means to continuously record the faults occurring in the insulation coating of said moving insulated wire.

References Cited

UNITED STATES PATENTS

| 2,809,348 | 10/1957 | Kellog et al. | 324—54 |
| 2,873,425 | 2/1959 | Huggins | 324—54 |
| 2,916,697 | 12/1959 | Boode | 324—54 |
| 2,941,144 | 6/1960 | Cannon | 324—54 |
| 2,977,531 | 3/1961 | Humes et al. | 324—54 |
| 3,040,249 | 6/1962 | Schwarckopf et al. | 324—54 |
| 3,323,701 | 6/1967 | Gurski et al. | 324—54 |

FOREIGN PATENTS

| 1,299,257 | 6/1962 | France. |

RUDOLPH V. ROLINEC, *Primary Examiner.*

G. R. STRECKER, *Assistant Examiner.*